(12) United States Patent
Zhao et al.

(10) Patent No.: US 10,728,123 B2
(45) Date of Patent: Jul. 28, 2020

(54) DEVICE DATA COLLECTOR

(71) Applicants: Kabushiki Kaisha Toshiba, Minato-ku (JP); Toshiba TEC Kabushiki Kaisha, Shinagawa-ku (JP)

(72) Inventors: Dehua Zhao, Irvine, CA (US); Christopher Nguyen, Huntington Beach, CA (US); Michael Yeung, Mission Viejo, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 400 days.

(21) Appl. No.: 15/455,465

(22) Filed: Mar. 10, 2017

(65) Prior Publication Data

US 2018/0077036 A1 Mar. 15, 2018

Related U.S. Application Data

(60) Provisional application No. 62/394,002, filed on Sep. 13, 2016, provisional application No. 62/137,455, filed on Mar. 24, 2015.

(51) Int. Cl.
*G06F 15/16* (2006.01)
*H04L 12/26* (2006.01)
(Continued)

(52) U.S. Cl.
CPC ........ *H04L 43/065* (2013.01); *H04L 41/0213* (2013.01); *H04L 67/10* (2013.01);
(Continued)

(58) Field of Classification Search
CPC .................................................. H04L 43/065
See application file for complete search history.

(56) References Cited

U.S. PATENT DOCUMENTS

2002/0194180 A1* 12/2002 Alsop ................ G03G 15/5075
2009/0066991 A1* 3/2009 Lee ..................... H04L 41/0213
358/1.15
(Continued)

OTHER PUBLICATIONS

"Machado et al., SNMP Management of Urban Areas Remote Monitoring via open platform Proxy-IP, Jun. 22, 2015, Conference Proceedings Paper, Remote Sensing, 1st International Electronicd Conference on Remote Sensing Jun. 22-Jul. 5, 2025, pp. 1-6" (Year: 2015).*

(Continued)

*Primary Examiner* — Kevin T Bates
*Assistant Examiner* — Clarence D McCray
(74) *Attorney, Agent, or Firm* — Ulmer & Berne LLP

(57) ABSTRACT

A stand-alone data collector is configured to obtain configuration data that includes IP addresses to be monitored when the data collector is started. The data collector performs simple network management protocol (SNMP) walks of the management information bases (MIBs) of networked document processing devices associated with the monitored IP addresses to obtain meter data associated with usage of the networked document processing devices. The data collector aggregates the meter data and forwards the aggregated meter data to a network server and other recipients designated in the configuration data. The data collector can be configured to discover networked document processing devices associated with the monitored IP addresses. The data collector can include a chassis that houses a Raspberry Pi-based circuit board that performs the data collection operations.

16 Claims, 7 Drawing Sheets

(51) Int. Cl.
   *H04L 29/08* (2006.01)
   *H04W 4/38* (2018.01)
   *H04W 4/70* (2018.01)
   *H04L 12/24* (2006.01)
   *H04L 29/12* (2006.01)

(52) U.S. Cl.
   CPC .............. *H04W 4/38* (2018.02); *H04W 4/70* (2018.02); *H04L 41/12* (2013.01); *H04L 61/2007* (2013.01)

(56) References Cited

U.S. PATENT DOCUMENTS

2016/0299515 A1* 10/2016 Sagarra Rius ......... G05B 15/02
2016/0352144 A1* 12/2016 Shelton .................. G05B 15/02
2018/0077036 A1*  3/2018 Zhao ....................... H04L 67/10

OTHER PUBLICATIONS

"V. Fernandez, Arduino and Nagios integration for monitoring, Feb. 27, 2020, Journal of Physics: Conference Series, 20th International Conference on Computing in High Energy and Nuclear Physics, IOP Publishing, pp. 1-7" (Year: 2020).*
"Kovac et al., Keeping Eyes on your Home: Open-source Network Monitoring Center for Mobile Devices, 2015, IEEE, pp. 612-616" (Year: 2015).*
"Joshi et al., Agent base network Traffic Monitoring, May 2013, International Journal of Innovative Research in Science, Engineering and Technology, vol. 2, Issue 5, pp. 1799-1803" (Year: 2013).*
"Poloni et al., Remote Control of Low Cost devices Using SNMP Agents, 2017, IEEE, pp. 1-6." (Year: 2017).*

* cited by examiner

General Information }
Serial Number: 00000000fb8dfc95
Version: 4.0.0.0
Meter Collection Enabled: True  }- 502
Last Collected: 06/30/2016   16:31
Disk usage: 10%
Status: Running/ Error: ............

Debug Mode
ECC URL [https://production]  }- 504
[Radio Button]

Network Settings
Address Mode: DHCP (default) or Static
IP Address 10.1.20.100 (Editable if address mode is static)
Subnet Mask 255.2555.254.0 (Editable if address mode is static)
Default Gateway 10.1.20.1 (Editable if address mode is static)
Primary DNS 10.92.32.21 (Editable if address mode is static)  }- 506
Secondary DNS 10.1.0.31 (Editable if address mode is static)
Proxy Address 10.1.50.54
Proxy Username XXX
Proxy Password XXX
[Radio Button]

Test Connectivity
Click the test button to test Meter Collection functionality.
Optional test MFP IP address [xxx.xxx.xxx.xxx]

[Radio Button]
Discovery under collector's subnet: 10 devices were found    OK / Error
Registration: https://production    Registered / Error  }- 508
Send Data: {User-input IP address for MFP}    OK / Error

Restart Service
Click the Restart button to restart Meter Collection Service  }- 512
[Radio Button]

Current Configuration
Community String: public
IP Ranges: 10.1.50.1 – 10.1.50.255  }- 514
IP Addresses: 10.1.54.101

FIG. 5

Collector Settings | Collectors | Collected Devices

ConfigurationOwner c me000045 — 602

Identify the devices by entering the network subnetes. You can enter static IP addresses or IP ranges for discovery.

604

10.1.54.1-10.1.54.255

Enter a list of IP Addresses, subnets or subnet ranges in the text box.

Enter each address on its own line. Use a dash to separate an IP range.

☐ Provide load balancing and failover

☐ Stop Collecting Meter Data

Settings will not be applied until the next device communication.

Cancel        OK

DEVICE DATA COLLECTOR

CROSS-REFERENCE TO RELATED APPLICATIONS

This application claims the benefit of U.S. Provisional Application No. 62/394,002, filed Sep. 13, 2016, which is incorporated herein by reference.

TECHNICAL FIELD

This application relates generally to a collector for monitoring networked document processing devices. The application relates more particularly to a Raspberry Pi based stand-alone collector that monitors a plurality of network document processing devices such as multifunction peripherals using simple network management protocol (SNMP).

SUMMARY

In an example embodiment, a device includes a processor, a memory for storing data and instructions, and a network interface. The network interface allows data communication on a network with one or more document processing devices, such as multifunction peripherals or MFPs or third party document processing devices, and data communication across the network to a network server, for example a server that supports cloud services. The processor is configured to obtain configuration data, for example from memory or the network server, and based at least in part on the configuration data the processor is further configured to perform a probe of one or more of the document processing devices on the network. The processor receives meter data in response to the probe and forwards the received meter data across the network to the network server. The probe can be a simple network management protocol (SNMP) walk of the management information base (MIB) of a document processing device. The processor can discover one or more of the document processing devices, for example by scanning a network IP address, a subnet, or a range of IP address for a document processing device. The device can include a chassis configured to secure a Raspberry Pi-based circuit board, and the Raspberry Pi-based circuit board can include the processor, memory, and network interface. The device can include a suitable power supply or power adaptor.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFP means any of the forgoing.

Operations of document processing devices such as printing, faxing or copying may include depletion of consumables, such as paper, ink or toner. Document processing devices may include counters or other usage monitoring systems to allow for attending to maintenance or servicing operations at known intervals. Monitoring of device operation facilitates replacement of such consumables and facilitates assessing charges for device use. In other situations, monitoring of device operation facilitates imposition of usage quotas.

Given the expense in obtaining and maintain MFPs, MFPs are frequently shared by users and monitored by technicians via a data network. MFPs can be monitored using Simple Network Management Protocol (SNMP). Each brand or model of MFP monitored via SNMP includes a management information base (MIB) with multiple Object Identifiers (OIDs) that define each kind of data on the MFP that can be monitored. Example OIDs can include data such a counters, paper usage, color printing, toner levels and so forth.

However, in order to monitor document processing devices remotely, a server requires information about the document processing devices to be monitored. For example, a server may need to be pre-configured with the Internet Protocol (IP) addresses of each remote document processing devices that is to be monitored. Each time a new document processing device is added to the network, the remote server may need to be updated with configuration data about the added document processing device in order to monitor the device.

BRIEF DESCRIPTION OF THE DRAWINGS

FIG. 5 is a diagram of an example configuration screen for an SNMP collector.

FIG. 6 is a diagram of an example configuration pop-up window for configuring an SNMP collector.

DETAILED DESCRIPTION

Figure 1:
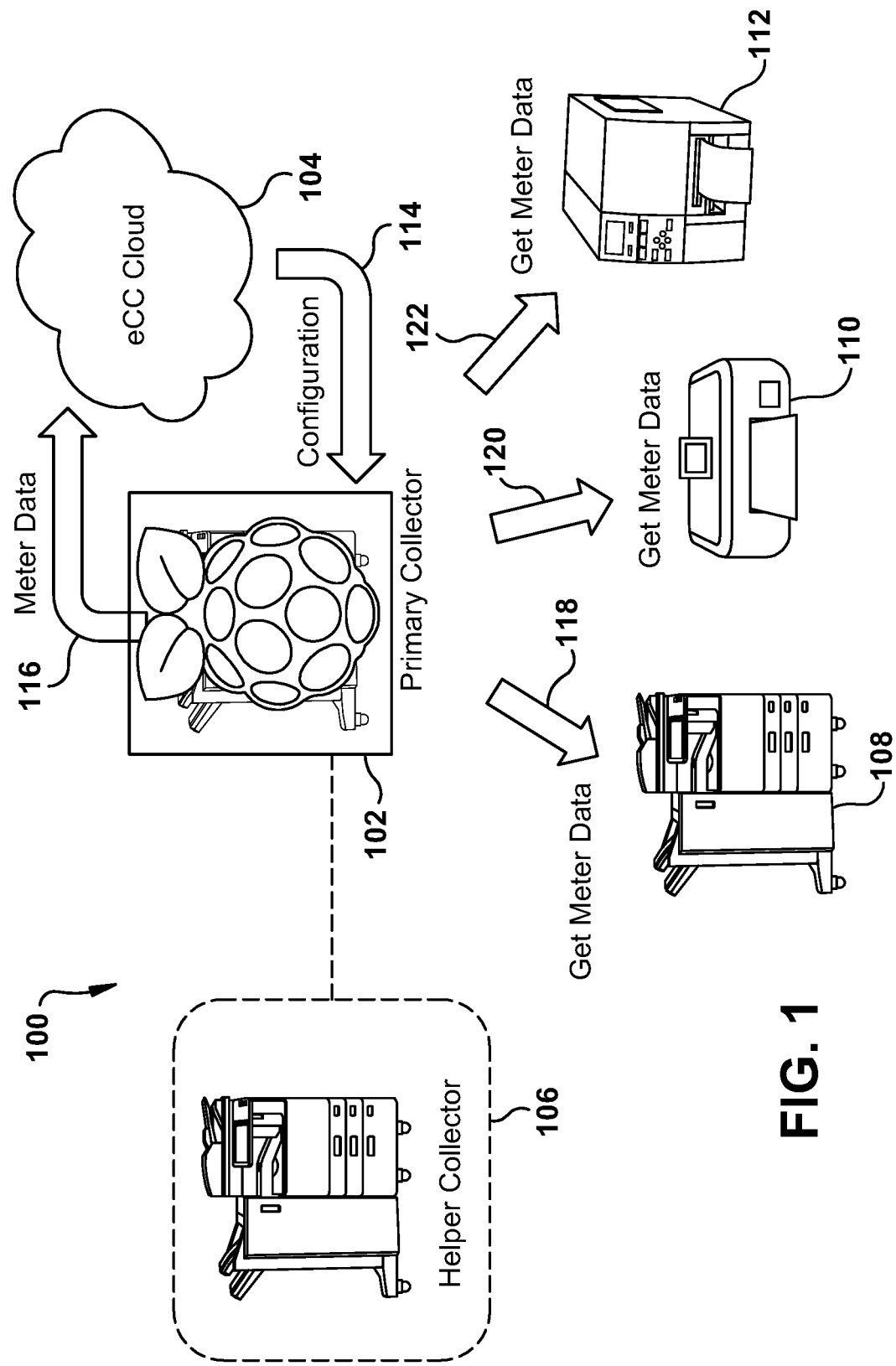
FIG. 1 is a diagram of an example system that includes an SNMP collector and monitored document processing devices according to an embodiment of the disclosure.

Turning to FIG. 1, illustrated is example embodiment of a system 100 that includes a primary collector 102, cloud services 104, a multifunction peripheral or MFP configured as a secondary collector 106, and monitored devices 108, 110, 112. The primary collector 102 obtains configuration information 114 from cloud services 104, for example Toshiba's eBRIDGE CloudConnect. Cloud services 104 suitably reside in one or more network servers. The network suitably comprises a local area network (LAN), a remote local area network (RLAN), a wide area network (WAN) which may comprise the Internet, or any combination thereof.

The primary collector 102 polls the monitored devices 108, 110, 112 to obtain meter data 118, 120, 122. Meter data 118, 120, 122 can include counters, such as page count, paper usage, color printing, consumable usage such as toner levels, service intervals, device maintenance information, service interruptions, malfunctions, and so forth as would be understood in the art. The primary collector 102 can retrieve data periodically or at set or selected intervals.

The primary collector 102 collects the meter data 118, 120, 122 from the monitored devices 108, 110, 112 and forwards the collected meter data 116 to the cloud services 104. Collecting data facilitates enforcement of usage policies or job accounting. Accumulated device data is suitably made available by the cloud services 104 to an administrator or technician. In a configuration, the primary collector 102 can forward collected meter data 116 directly to a user, such as a technician or administrator.

A secondary collector 106, or helper collector, can be configured as a backup collector for the primary collector 102 in the event of a fault or other condition of the primary collector 102. For an example failover operation, see co-pending U.S. application Ser. No. 14/959,478 filed Sep. 21, 2015 and titled "Distributed Primary Device Data Collector with Failover Operation", which is herein incorporated by reference in its entirety. The secondary collector 106 can be an MFP that is executing instructions for collecting data from the monitored devices 108, 110, 112. In a configuration, the primary collector 102 also can obtain meter data from the MFP.

Advantageously, the primary collector 102 can operate in a stand-alone configuration. For example, a customer network may consist of only monitored devices 108, 110, 112. Or a customer network may include one or more MFPs, but the MFPs may not be configured to collect data from monitored device. In these examples, in order to monitor the monitored devices 108, 110, 112, the customer would be required to maintain a server, adding additional costs and labor. Customers could use different operating systems, requiring support not only across operating systems or but also requiring support for different versions of operating systems. A stand-alone primary collector 102 advantageously has no hardware or software dependency based on the customer's network.

The primary collector 102 can comprise dedicated hardware such as a Raspberry Pi device configured to execute instructions for collecting data from monitored devices 108, 110, 112, using for example Simple Network Management Protocol (SNMP) to obtain meter data from each of the monitored devices. A Raspberry Pi device advantageously provides an economical solution for inexpensively monitoring multiple monitored devices 108, 110, 112. As would be understood in the art, a Raspberry Pi device is essentially a reduced footprint personal computer that can be configured to run an application upon startup. The Raspberry Pi device comprises a Raspberry Pi board, a case, and a power supply such as a common 5 Volt power supply or AC adaptor. The Raspberry Pi device advantageously includes a networking port, processor, and memory, as detailed below for FIG. 3 and the accompanying detailed description. The startup application can be loaded into memory, for example using a secure digital or SD card or programmable memory. The configuration for the Raspberry Pi device can be locally configured, or managed through cloud services 104 or both as describe below in greater detail.

In an embodiment, the primary collector 102 can be configured to discover monitored devices 108, 110, 112 in the local network. The following examples detail how a primary collector 102 can operate in a substantially plug-and-play modality. For example, the primary collector 102 can be configured to obtain a dynamically assigned IP address upon boot up and then discover monitored devices 108, 110, 112 within the local subnet. In another example, the primary collector 102 can be configured with an IP address and a subnet to monitor for monitored devices 108, 110, 112. The primary collector 102 can store discovered monitored devices 108, 110, 112 in memory for future use. The primary collector 102 can also be configured with the IP addresses of the monitored devices 108, 110, 112 to monitor. Example configurations also are detailed below.

Figure 2:
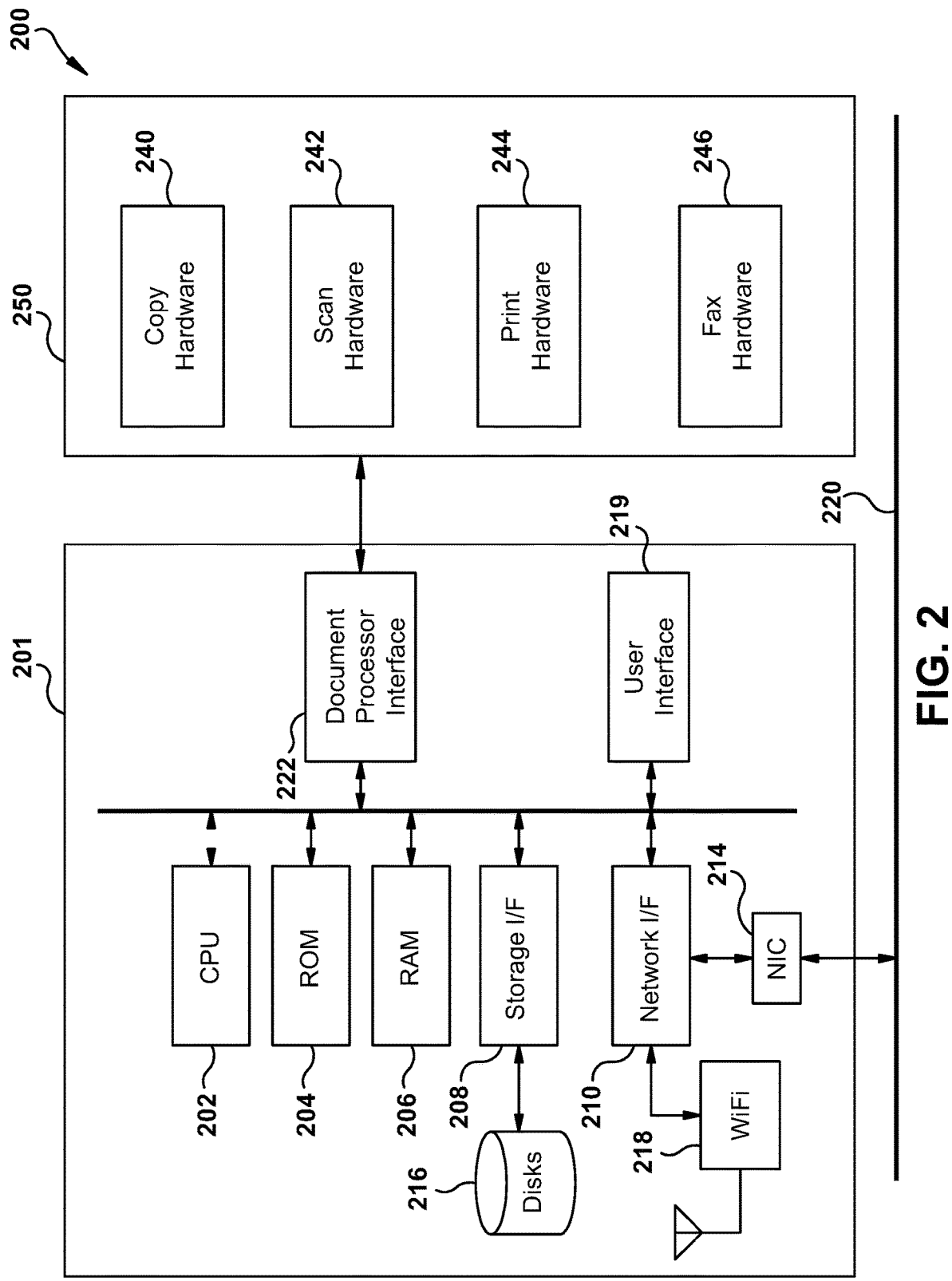
FIG. 2 is a block diagram of an example of components of a multifunction peripheral according to an embodiment of the disclosure.

Turning now to FIG. 2, illustrated are functional components 200 suitably comprising a multifunctional peripheral such as MFP 104 of FIG. 1. Included is controller 201 comprised of one or more processors, such as that illustrated by processor 202. Each processor is suitably associated with non-volatile memory such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 202 can also be in data communication with any suitable user input/output (I/O) interface which provides data communication with user peripherals, such as displays, keyboards, mice, track balls, touch screens, or the like. Hardware monitor 221 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
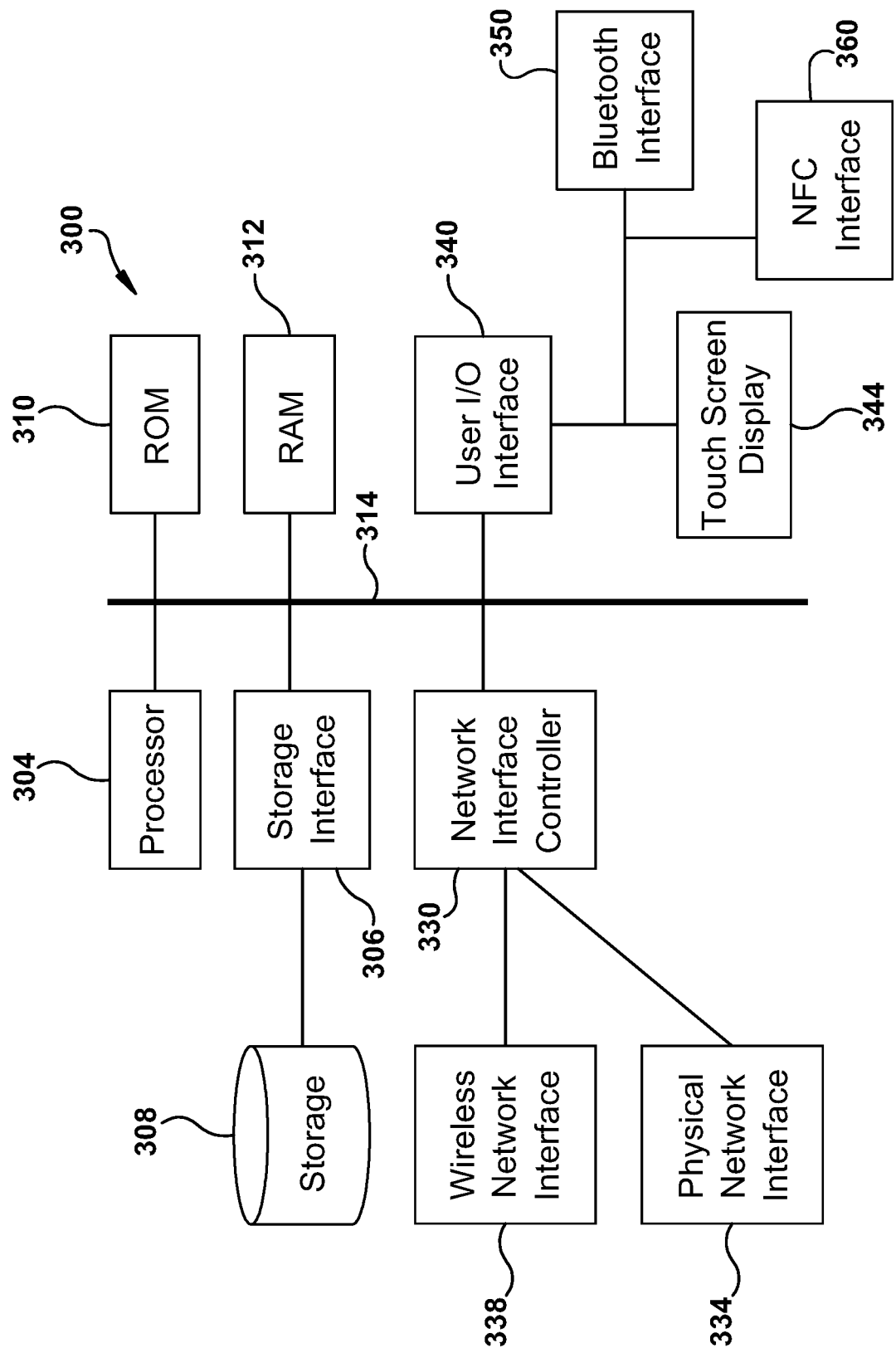
FIG. 3 is a block diagram of an example of components of a computing device according to an embodiment of the disclosure.

Turning now to FIG. 3, illustrated is an example embodiment 300 of a digital computing device such as the primary collector 102 or a networked server associated with the cloud storage 104, and which architecture is suitably implemented in a document processing device such as an MFP controller. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 316 for reading or writing to a data storage system 318, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338, such as one or more of the networks detailed above.

Processor 304 is also in data communication with a user input/output (I/O) interface 340 which provides data communication with optional user peripherals, such as a display 344, a keyboard 350, a mouse 360 or any other interface, such as track balls, touchscreens, or the like. It will be understood that functional units are suitably comprised of intelligent units, including any suitable hardware or software platform.

Figure 4:
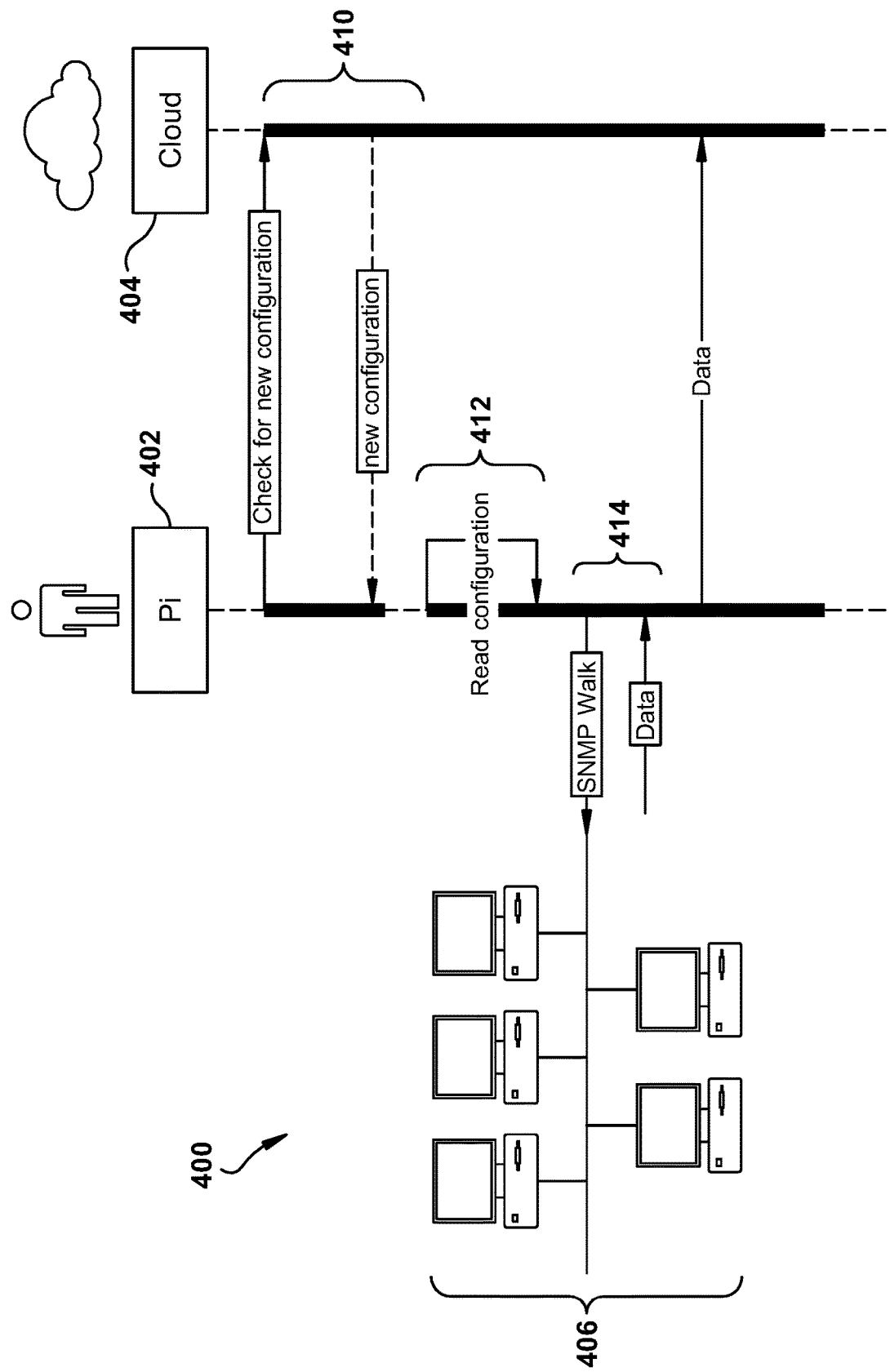
FIG. 4 is a flow diagram of example operations of an SNMP collector.

FIG. 4 illustrates example operations of a system 400 including a collector 402, a cloud server 404, and a monitored network 406 comprising a plurality of network connected document processing devices. When the collector 402 is powered on and boots up, a data collection module in the collector 402 begins executing. In process 410, the collector 402 can optionally check for new configuration data from the cloud server 404. In process 412, the collector 402 reads configuration information from memory and uses any new configuration data received from the cloud server 404 in process 410. In process 414, the collector 402 polls the monitored devices in the monitored network 406. For example, the collector 402 can perform an SNMP walk of the managed information bases (MIBs) of the monitored devices to obtain meter data. In process 416, the collector 402 forwards collected data to the cloud server 404. In a configuration, the collected data can be forwarded directly to a user, such as a technician or administrator associated with one or more of the monitored devices.

FIG. 5 illustrates and example embodiment of configuration data 500 for a collector. The configuration data 500 can include general information 502 about the collector such as serial number, version, and status. The configuration data 500 can include debugging tools 504 and test tools 508 for verifying whether the collector can communicate with the network server and discover devices to monitor. The configuration data 500 can include a restart tool 512. The configuration data 500 can include network settings 506 for the collector such as an IP address, subnet, gateway, domain name servers, and proxy specifics. The configuration data 500 can include subnets, IP ranges, or individual IP addresses of devices to be discovered or monitored. The configuration data 500 can be changed, for example by selecting a radio button in an associated menu.

FIG. 6 illustrates an example pop-up configuration window 600 for configuring configuration data for a collector. For example, a user such as an administrator or technician can configure configuration data for a collector using a suitable web-based interface. In the pop-up configuration window 600 of FIG. 6, a user can configure a particular collector 602 to collect data from monitored devices associated with designated IP addresses 604, which can be a subnet, a list of IP addresses, or a range of IP addresses as would be understood in the art.

Figure 7:
FIG. 7 is a diagram of an example configuration pop-up window for reviewing document processing devices monitored by an SNMP collector.

FIG. 7 illustrates an example pop-up window 700 of devices 704 monitored by a particular collector 702. Clicking on individual devices 704 can present the user with additional information such as the metered data. Other pop-up windows, configuration windows, web pages, application programming interfaces, and so forth can be used to manage and monitor collectors and collected data from monitored devices as would be understood in the art.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A device comprising:
 a stand-alone data collector comprising reduced footprint circuit board computer secured to a chassis including
 a processor,
 a memory in data communication with the processor, the memory operable for storage of data and instructions, and
 a network interface configured for data communication with a plurality of networked document processing devices and a network server via an associated network; and
 a power adapter configured to provide power to the reduced footprint circuit board computer; and
 wherein the processor is configured to
  obtain configuration data including an IP address of the network server and one or more IP addresses to be monitored,
  execute instructions to perform, via the network interface, a probe comprised of an SNMP walk of at least one of the plurality of networked document processing devices based at least in part on the configuration data,
  receive, via the network interface, meter data in response to the probe, and
  forward, via the network interface, the received meter data to the network server.

2. The device of claim 1 wherein the processor is further configured to discover, via the network interface, at least one of the plurality of networked document processing devices.

3. The device of claim 2 wherein the processor is further configured to scan one or more internet protocol (IP) addresses.

4. The device of claim 3 wherein the IP addresses comprise one or more of a range of IP addresses, and a subnet of IP addresses.

5. The device of claim 1 wherein the processor is configured to obtain the configuration data from one or more of the memory, a secure digital card, or the network server via the network interface.

6. The device of claim 1 wherein the meter data comprises one or more of page count data, color page count data, paper count data, ink data, or toner data.

7. A method comprising:
 obtaining configuration data, including IP addresses of a network server and one or more networked document processing device to be monitored, by a stand-alone reduced footprint circuit board collector device;
 executing instructions, by a processor of the collector device and via an associated network interface, to perform a probe comprised of an SNMP walk of at least one networked document processing device based at least in part on the configuration data;
 receiving, by the processor and via the network interface, meter data in response to the probe; and
 forwarding, by the processor and via the network interface, the received meter data to the network server identified in the configuration data.

8. The method of claim 7 further comprising:
 discovering, via the network interface, at least one networked document processing device.

9. The method of claim 8 further comprising
scanning one or more internet protocol (IP) addresses to discover the at least one networked document processing device.

10. The method of claim 9 wherein the IP addresses comprise one or more of a range of IP addresses, and a subnet of IP addresses.

11. The method of claim 7 wherein obtaining the configuration data further comprises obtaining the configuration data from one or more of the memory, a secure digital card, or the network server via the network interface.

12. The method of claim 7 wherein the meter data comprises one or more of page count data, color page count data, paper count data, ink data, or toner data.

13. The method of claim 7 further comprising:
aggregating the meter data from a plurality of networked document processing devices prior to forwarding the meter data.

14. The method of claim 7 further comprising:
forwarding, by the processor and via the network interface, the received meter data to a user identified in the configuration data.

15. A stand-alone data collector comprising:
a reduced footprint circuit board computer including
a chassis,
a power adapter,
a processor,
a memory in data communication with the processor, the memory operable for storage of data and instructions, and
a network interface in data communication with the processor and configured for data communication with
a plurality of networked document processing devices, and
a network server via an associated network, and
wherein upon being powered on or restarted, the circuit board is configured to
obtain configuration data including the IP address of the network server,
obtain configuration data including one or more IP addresses to be monitored,
perform an SNMP walk of one or more networked document processing devices associated with the monitored IP addresses,
receive, via the network interface, meter data in response to the SNMP walk,
aggregate the received meter data, and
forward, via the network interface, the received meter data to the network server.

16. The stand-alone data collector of claim 15 wherein each of the one or more IP addresses to be monitored is selected from the group consisting of an IP address, a range of IP addresses, and a subnet of IP addresses, and wherein the meter data includes one or more of page count data, color page count data, paper count data, ink data, or toner data.

* * * * *